(12) United States Patent
Oguchi et al.

(10) Patent No.: US 9,695,296 B2
(45) Date of Patent: Jul. 4, 2017

(54) INK JET BLACK INK COMPOSITION FOR SUBLIMATION TRANSFER, AND DYED ARTICLE AND METHOD FOR PRODUCING DYED ARTICLE

(71) Applicant: Seiko Epson Corporation, Tokyo (JP)

(72) Inventors: Hideki Oguchi, Fujimi (JP); Yasunari Ikeda, Shiojiri (JP); Shinichi Naito, Chino (JP); Takeshi Yano, Shiojiri (JP); Miho Nakamura, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/997,781

(22) Filed: Jan. 18, 2016

(65) Prior Publication Data

US 2016/0208119 A1    Jul. 21, 2016

(30) Foreign Application Priority Data

Jan. 21, 2015 (JP) ................. 2015-009814

(51) Int. Cl.

| | | |
|---|---|---|
| C09D 11/328 | (2014.01) | |
| C08K 5/18 | (2006.01) | |
| C08K 5/53 | (2006.01) | |
| C08K 5/3465 | (2006.01) | |
| C08K 5/23 | (2006.01) | |

(52) U.S. Cl.
CPC ............... C08K 5/18 (2013.01); C08K 5/23 (2013.01); C08K 5/3465 (2013.01); C09D 11/328 (2013.01)

(58) Field of Classification Search
CPC .......... C09D 11/328; C08K 5/18; C08K 5/23; C08K 5/3465
USPC ............... 106/31.27, 31.47, 31.58
See application file for complete search history.

(56) References Cited

U.S. PATENT DOCUMENTS

| | | | | |
|---|---|---|---|---|
| 9,534,128 B2 * | 1/2017 | Oguchi | ................ | C09D 11/328 |
| 2015/0116418 A1 * | 4/2015 | Oura | ................ | C09D 11/328 347/20 |
| 2015/0275425 A1 * | 10/2015 | Teranishi | ................ | D06P 5/00 8/471 |
| 2015/0286169 A1 * | 10/2015 | Teranishi | ................ | D06P 5/00 428/195.1 |
| 2015/0337152 A1 * | 11/2015 | Oguchi | ................ | C09D 11/328 106/31.47 |
| 2015/0337153 A1 * | 11/2015 | Oguchi | ................ | C09D 11/328 106/31.44 |
| 2016/0002847 A1 * | 1/2016 | Glenat | ................ | C09D 11/328 106/31.47 |
| 2016/0177099 A1 * | 6/2016 | Shimizu | ................ | C08L 101/00 430/17 |
| 2016/0208435 A1 * | 7/2016 | Oguchi | ................ | C09D 11/328 |

FOREIGN PATENT DOCUMENTS

| | | |
|---|---|---|
| JP | 2010-053197 A | 3/2010 |
| JP | 2015-010212 A | 1/2015 |
| WO | WO 2014/127050 A1 * | 8/2014 |
| WO | WO 2014/129322 A1 * | 8/2014 |

OTHER PUBLICATIONS

Extended European Search Report for Application No. EP 16 15 2210 dated Apr. 14, 2016 (5 pages).

* cited by examiner

*Primary Examiner* — Helene Klemanski
(74) *Attorney, Agent, or Firm* — Harness, Dickey & Pierce, P.L.C.

(57) ABSTRACT

An ink jet black ink composition for sublimation transfer includes water, a water-soluble organic solvent, C.I. Disperse Blue 360, and two or more disperse dyes that achieve a reflectance of less than 0.1 at a wavelength of 380 nm or more and 520 nm or less on a dyed article.

7 Claims, No Drawings

INK JET BLACK INK COMPOSITION FOR SUBLIMATION TRANSFER, AND DYED ARTICLE AND METHOD FOR PRODUCING DYED ARTICLE

BACKGROUND

1. Technical Field

The present invention relates to an ink jet black ink composition for sublimation transfer, and a dyed article and a method for producing the dyed article.

2. Related Art

Ink jet recording methods have been rapidly developed in a wide range of fields because ink jet recording methods enable recording of high resolution images with relatively simple apparatuses. In the development, various studies have been made on the image quality and the like of recorded articles obtained by such methods. For example, JP-A-2010-53197 discloses an ink jet ink to be transferred onto polyester fabrics by sublimation. The ink jet ink for sublimation transfer includes at least a sublimable dye, an acetylene glycol-based surfactant, a water-soluble organic solvent, and water. The water-soluble organic solvent includes at least glycerol, a glycol, and a glycol ether. In the ink, the content of the glycerol is in the range of 5 wt % or more and 30 wt % or less, the content of the glycol is in the range of 1 wt % or more and 15 wt % or less, and the content of the glycol ether is in the range of 0.1 wt % or more and 5 wt % or less. This ink jet ink has been developed for the purpose of providing an ink composition that can provide dense, clear full-color images. The ink jet ink reduces blur, missing dots, and nozzle deflection during printing without leading to stickiness of sublimation transfer paper on which images are printed or causing transferred images to be distorted as a result of being heat-pressed on polyester fabrics.

However, it is still difficult for the ink composition disclosed in JP-A-2010-53197 to have good intermittent characteristics and provide dyed articles having good tinge and high black density.

SUMMARY

An advantage of some aspects of the invention is that an ink jet black ink composition for sublimation transfer that has good intermittent characteristics and provides a dyed article having good tinge and high black density, and a dyed article and a method for producing the dyed article are provided.

The inventors of the invention have diligently carried out studies to solve the above-mentioned problem. As a result, the inventors have found that the problem can be solved by adding particular components to an ink composition, completing the invention.

Specifically, the invention is as follows.

According to a first aspect of the invention, an ink jet black ink composition for sublimation transfer includes water, a water-soluble organic solvent, C.I. Disperse Blue 360, and two or more disperse dyes that achieve a reflectance of less than 0.1 at a wavelength of 380 nm or more and 520 nm or less on a dyed article.

In the ink jet black ink composition for sublimation transfer according to the first aspect, the disperse dyes may include at least one selected from the group consisting of C.I. Disperse Orange 25, C.I. Disperse Brown 27, and the compound represented by Formula (1).

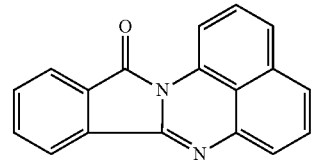

In the ink jet black ink composition for sublimation transfer according to the first aspect, the total content of C.I. Disperse Blue 360 and the disperse dyes may be 4.0 to 8.0 mass %.

In the ink jet black ink composition for sublimation transfer according to the first aspect, the mass ratio A of the total content of the disperse dyes to the content of C.I. Disperse Blue 360 may be 1.0 to 3.0.

In the ink jet black ink composition for sublimation transfer according to the first aspect, the water-soluble organic solvent may include at least one selected from the group consisting of glycerol and glycols.

In the ink jet black ink composition for sublimation transfer according to the first aspect, the content of the water-soluble organic solvent may be 10 to 30 mass %.

According to a second aspect of the invention, a method for producing a dyed article includes applying any one of the above-mentioned ink jet black ink compositions for sublimation transfer to an intermediate transfer medium by an ink jet method, and transferring to a recording medium the C.I. Disperse Blue 360 and the disperse dyes contained in the ink jet black ink composition for sublimation transfer by performing heating in a state where a surface of the intermediate transfer medium having thereon the ink jet black ink composition for sublimation transfer faces a surface of the recording medium to be dyed.

According to a third aspect of the invention, a dyed article is obtained by using any one of the above-mentioned ink jet black ink compositions for sublimation transfer.

DESCRIPTION OF EXEMPLARY EMBODIMENT

Although an embodiment of the invention (hereinafter referred to as "this embodiment") will be described below in detail, the invention is not limited to this embodiment and various modifications can be made without departing from the scope of the invention.

Ink Jet Black Ink Composition for Sublimation Transfer

An ink jet black ink composition for sublimation transfer (hereinafter also referred to as an "ink composition") according to this embodiment contains water, a water-soluble organic solvent, C.I. Disperse Blue 360, and two or more disperse dyes that achieve a reflectance of less than 0.1 at a wavelength of 380 nm or more and 520 nm or less on a dyed article.

When the ink composition according to this embodiment contains C.I. Disperse Blue 360 and two or more disperse dyes that achieve a reflectance of less than 0.1 at a wavelength of 380 nm or more and 520 nm or less on a dyed article, the light reflectance of the obtained dyed article can be controlled and, as a result, the dyed article has good tinge and high black density.

Water

Examples of water include water from which ionic impurities are removed as much as possible, for example, ultrapure water, and pure water, such as ion exchange water, ultrafiltered water, reverse osmosis water, and distilled water. When water sterilized by, for example, ultraviolet irradiation or addition of hydrogen peroxide is used, generation of fungi or bacteria can be avoided even after long-term storage of ink. This tends to further improve storage stability.

The content of water is preferably 50 to 90 mass %, more preferably 55 to 85 mass %, still more preferably 60 to mass % with respect to the total amount of the ink composition. When the content of water is in the above-mentioned range, the viscosity of ink can be easily adjusted and water can be easily removed after the ink is ejected, resulting in a high yield of recorded articles.

Water-Soluble Organic Solvent

Examples of the water-soluble organic solvent include, but are not limited to, glycols, such as ethylene glycol, diethylene glycol, triethylene glycol, polyethylene glycol, propylene glycol, dipropylene glycol, tripropylene glycol, polypropylene glycol, propanediol, butanediol, pentanediol, and hexylene glycol; lower alkyl ethers of glycols, such as ethylene glycol monomethyl ether, diethylene glycol monomethyl ether, diethylene glycol monoethyl ether, diethylene glycol monobutyl ether, and triethylene glycol monomethyl ether; and glycerol, 2-pyrrolidone, and N-methylpyrrolidone. Of these water-soluble organic solvents, at least one selected from the group consisting of glycerol and glycols is preferably contained in the ink composition. These water-soluble organic solvents in the ink composition tend to further improve intermittent characteristics. These water-soluble organic solvents may be used alone or in combination of two or more.

The content of the water-soluble organic solvent is preferably 5.0 to 30 mass %, more preferably 10 to 30 mass %, still more preferably 10 to 20 mass % with respect to the total amount of the ink composition. When the content of the water-soluble organic solvent is 5.0 mass % or more, the intermittent characteristics tends to be improved. When the content of the water-soluble organic solvent is 30 mass % or less, the viscosity of ink can be easily adjusted.

Dye

The ink jet black ink composition for sublimation transfer contains, as dyes, C.I. Disperse Blue 360 and two or more other disperse dyes that each individually achieve a reflectance of less than 0.1 at a wavelength of 380 nm or more and 520 nm or less on a dyed article. These two or more disperse dyes in the ink composition reduce blueness and further improve black density at the same dye concentration. The reflectance at a wavelength of 380 nm or more and 520 nm or less on a dyed article can be determined by the method described in Examples. The ink composition may contain disperse dyes other than the above-mentioned disperse dyes.

Examples of disperse dyes include, but are not limited to, the following disperse dyes.

Examples of yellow disperse dyes include, but are not limited to, C.I. Disperse Yellow 3, 4, 5, 7, 9, 13, 23, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 160, 162, 163, 164, 165, 179, 180, 182, 183, 184, 186, 192, 198, 199, 202, 204, 210, 211, 215, 216, 218, 224, 227, 231, and 232.

Examples of orange disperse dyes include, but are not limited to, C.I. Disperse Orange 1, 3, 5, 7, 11, 13, 17, 20, 21, 25, 29, 30, 31, 32, 33, 37, 38, 42, 43, 44, 45, 46, 47, 48, 49, 50, 53, 54, 55, 56, 57, 58, 59, 61, 66, 71, 73, 76, 78, 80, 89, 90, 91, 93, 96, 97, 119, 127, 130, 139, and 142.

Examples of red disperse dyes include, but are not limited to, C.I. Disperse Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 266, 277, 278, 279, 281, 288, 298, 302, 303, 310, 311, 312, 320, 324, and 328.

Examples of violet disperse dyes include, but are not limited to, C.I. Disperse Violet 1, 4, 8, 23, 26, 27, 28, 31, 33, 35, 36, 38, 40, 43, 46, 48, 50, 51, 52, 56, 57, 59, 61, 63, 69, and 77.

Examples of green disperse dyes include, but are not limited to, C.I. Disperse Green 9.

Examples of brown disperse dyes include, but are not limited to, C.I. Disperse Brown 1, 2, 4, 9, 13, 19, and 27.

Examples of blue disperse dyes include, but are not limited to, C.I. Disperse Blue 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 134, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 266, 267, 268, 270, 284, 285, 287, 288, 291, 293, 295, 297, 301, 315, 330, 333, 359, and 360.

Examples of black disperse dyes include, but are not limited to, C.I. Disperse Black 1, 3, 10, and 24.

Of these disperse dyes, at least one selected from the group consisting of C.I. Disperse Orange 25, C.I. Disperse Brown 27, and the compound represented by Formula (1) is preferably contained as a disperse dye that achieves a reflectance of less than 0.1 at a wavelength of 380 nm or more and 520 nm or less on a dyed article. Such a disperse dye in the ink composition further reduces blueness and further improves black density at the same dye concentration.

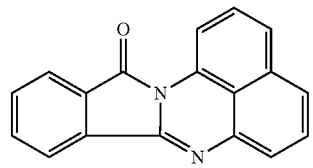

(1)

The content of the C.I. Disperse Orange 25, the C.I. Disperse Brown 27, and the compound represented by Formula (1) is preferably 0.5 to 3.0 mass %, more preferably 0.75 to 2.5 mass %, still more preferably 1.0 to 2.0 mass % with respect to the total amount of the ink composition.

The total content of the C.I. Disperse Blue 360 and the disperse dyes that each individually achieve a reflectance of less than 0.1 at a wavelength of 380 nm or more and 520 nm or less on a dyed article is preferably 4.0 to 8.0 mass %, more preferably 4.5 to 7.5 mass %, still more preferably 5.0 to 7.0 mass % with respect to the total amount of the ink composition. When the total content of the disperse dyes is 4.0 mass % or more, the black density tends to be high. When the total content of the disperse dyes is 8.0 mass % or less, the intermittent characteristics tend to be improved.

The mass ratio A of the total content of the disperse dyes that each individually achieve a reflectance of less than 0.1 at a wavelength of 380 nm or more and 520 nm or less on a dyed article to the content of the C.I. Disperse Blue 360 (the total content of the disperse dyes that each individually achieve a reflectance of less than 0.1 at a wavelength of 380 nm or more and 520 nm or less on a dyed article/the content of the C.I. Disperse Blue 360) is preferably 1.0 to 4.0, more preferably 1.0 to 3.5, still more preferably 1.0 to 3.0. When the mass ratio A is in the above-mentioned range, the blueness tends to be suppressed so that the black density tends to be high at the same dye concentration, resulting in good tinge.

Dispersant

The ink composition may contain a dispersant. The dispersant in the ink composition tends to increase the dispersion stability of the dyes in the ink composition and thus tends to improve the storage stability, the long-term ejection stability, and the like of the ink composition. Examples of the dispersant include, but are not limited to, anionic dispersants, nonionic dispersants, and polymer dispersants.

Examples of anionic dispersants include, but are not limited to, aromatic sulfonic acid-formaldehyde condensates, β-naphthalenesulfonic acid-formaldehyde condensates, alkylnaphthalenesulfonic acid-formaldehyde condensates, and creosote oil sulfonic acid-formaldehyde condensate.

Examples of the aromatic sulfonic acid include, but are not limited to, creosote oil sulfonic acid, cresol sulfonic acid, phenol sulfonic acid, β-naphthol sulfonic acid, alkylnaphthalenesulfonic acids, such as methylnaphthalenesulfonic acid and butylnaphthalenesulfonic acid, a mixture of β-naphthalenesulfonic acid and β-naphthol sulfonic acid, a mixture of cresol sulfonic acid and 2-naphthol-6-sulfonic acid, and lignin sulfonic acid.

Examples of nonionic dispersants include, but are not limited to, ethylene oxide adducts of phytosterols and ethylene oxide adducts of cholestanols.

Examples of polymer dispersants include, but are not limited to, polyacrylic acid partial alkyl ester, polyalkylene polyamine, polyacrylates, a styrene-acrylate copolymer, and a vinylnaphthalene-maleate copolymer.

The content of the dispersant is preferably 50 mass % to 150 mass %, more preferably 75 mass % to 125 mass % with respect to the total amount of the dyes contained in the ink composition. When the content of the dispersant is in the above-mentioned range, the dyes tend to have high dispersion stability.

Surfactant

The ink composition preferably contains a surfactant. Examples of the surfactant include, but are not limited to, acetylene glycol-based surfactants, anionic surfactants, and silicone-based surfactants.

Examples of acetylene glycol-based surfactants include, but are not limited to, alkylene oxide adducts of 2,4,7,9-tetramethyl-5-decyne-4,7-diol and 2,4,7,9-tetramethyl-5-decyne-4,7-diol, and alkylene oxide adducts of 2,4-dimethyl-5-decyn-4-ol and 2,4-dimethyl-5-decyn-4-ol. At least one selected from such acetylene glycol-based surfactants is preferably used. Examples of commercial products of acetylene glycol-based surfactants include, but are not limited to, Olfine 104 series and Olfine E series such as Olefine E1010 (trade names, available from Nissin Chemical Industry Co., Ltd.) and Surfynol 465 and Surfynol 61 (trade names, available from Nissin Chemical Industry Co., Ltd.) These acetylene glycol-based surfactants may be used alone or in combination of two or more.

Examples of anionic surfactants include, but are not limited to, alkylsulfocarboxylates, alkyl diphenyl ether disulfonates, α-olefinsulfonates, polyoxyethylene alkyl ether acetates, N-acylamino acid and salts thereof, N-acylmethyltaurates, alkylsulfate polyoxyalkyl ether sulfates, alkylsulfate polyoxyethylene alkyl ether phosphates, rosin acid soap, castor oil sulfates, laurylalcoholsulfates, alkylphenolphosphates, alkylphosphates, alkylarylsulfonates, diethylsulfosuccinates, diethylhexylsulfosuccinates, and dioctylsulfosuccinates. Examples of commercial products of anionic surfactants include, but are not limited to, PELEX SS-H, PELEX SS-L (trade names, available from Kao Corporation). These anionic surfactants may be used alone or in combination of two or more.

Examples of silicone-based surfactants include, but are not limited to, polysiloxane compounds and polyether-modified organosiloxane. Specific examples of commercial products of silicone-based surfactants include, but are not limited to, BYK-306, BYK-307, BYK-333, BYK-341, BYK-345, BYK-346, BYK-347, BYK-348, and BYK-349 (trade names, available from BYK Japan KK.); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, available from Shin-Etsu Chemical Co., Ltd.).

The content of the surfactant is preferably 0.1 to 2.5 mass %, more preferably 0.1 to 1.0 mass % with respect to the total amount of the ink composition. When the content of the surfactant is in the above-mentioned range, the dyes tend to have high dispersion stability.

Other Components

In order to appropriately maintain the storage stability and the ejection stability from a head, to avoid clogging, and to inhibit degradation of the ink composition, the ink composition may optionally contain various additives, such as a dissolution aid, a viscosity modifier, a pH adjuster, an antioxidant, a preservative, an antiseptic, a corrosion inhibitor, and a chelating agent for capturing metal ions that affect dispersion.

Method for Producing Dyed Article

A method for producing a dyed article according to this embodiment includes applying the ink composition to an intermediate transfer medium by an ink jet method and transferring to a recording medium C.I. Disperse Blue 360 and the disperse dyes contained in the ink composition by performing heating in a state where a surface of the intermediate transfer medium having the ink composition thereon faces a surface of the recording medium to be dyed.

Application Step

The application step involves applying the ink composition to an intermediate transfer medium by an ink jet method. The ejection of the ink composition by an ink jet method can be performed with a publicly known ink jet recording apparatus. Examples of the ejection method that can be used include a piezoelectric method and a method of ejecting ink due to ink bubbles formed by heating the ink. Of these methods, the piezoelectric method is preferred because, for example, the ink composition is unlikely to degrade.

Intermediate Transfer Medium

Examples of the intermediate transfer medium that can be used include, but are not limited to, paper, such as plain paper, and a recording medium provided with an ink-receiving layer (called, for example, ink jet paper or coated paper). Of these, paper provided with an ink-receiving layer formed of inorganic fine particles, such as silica, is preferred. With such paper, the intermediate transfer medium in which color bleeding and the like are reduced in the process of drying the ink composition applied to the intermediate transfer medium can be obtained. In addition, the dyes tend to sublimate smoothly in the subsequent transfer step.

Transfer Step

The transfer step involves transferring to a recording medium C.I. Disperse Blue 360 and the disperse dyes contained in the ink composition by performing heating in a state where a surface of the intermediate transfer medium having the ink composition thereon faces a surface of the recording medium to be dyed.

The heating temperature in the transfer step is preferably, but not necessarily, 160° C. or more and 220° C. or less, more preferably 170° C. or more and 200° C. or less. The heating temperature in the above-mentioned range tends to reduce energy used for the transfer and improve the yield of the dyed article. In addition, the dyed article thus obtained tends to have good color development.

The heating time in the transfer step is preferably 30 seconds or more and 90 seconds or less, more preferably 45 seconds or more and 60 seconds or less, depending on the heating temperature. The heating time in the above-mentioned range tends to reduce energy used for the transfer and improve the yield of the dyed article. In addition, the dyed article thus obtained tends to have good color development.

In this step, heating may be performed in a state where the surface of the intermediate transfer medium having the ink composition thereon faces the recording medium with a predetermined distance therebetween or in a state where the intermediate transfer medium and the recording medium are in close contact with each other. Preferably, heating is performed in a state where the intermediate transfer medium and the recording medium are in close contact with each other. This heating tends to reduce energy used for the transfer and improve the yield of the dyed article. In addition, the positional misalignment between the recording medium and the intermediate transfer medium in this step is unlikely to occur, which tends to provide a dyed article in which dyes are accurately transferred to desired positions and improve the color development of the resulting dyed article.

Recording Medium

Examples of the recording medium include, but are not limited to, fabric (e.g., hydrophobic fiber fabric), resin (plastic) film, paper, glass, metal, and ceramic. The recording medium may have a three-dimensional shape, such as a sheet-like shape, a spherical shape, or a rectangular parallelepiped shape.

When the recording medium is a fabric, examples of fibers constituting the fabric include, but are not limited to, polyester fiber, nylon fiber, triacetate fiber, diacetate fiber, polyamide fiber, and blends of two or more of these fibers. In addition, blends of such fibers and regenerated fibers, such as rayon, or natural fibers, such as cotton, silk, and wool, may be used.

When the recording medium is a resin (plastic) film, examples of the resin (plastic) film used include, but are not limited to, a polyester film, a polyurethane film, a polycarbonate film, a polyphenylene sulfide film, a polyimide film, and a polyamide-imide film. The resin (plastic) film may be a laminate in which two or more layers are stacked, or may be formed of a gradient material the composition of which changes with gradient.

Other Steps

In addition to the above-mentioned steps, the method for producing a dyed article according to this embodiment may further include other steps (pre-treatment step, intermediate treatment step, and post-treatment step). Examples of the pre-treatment step include, but are not limited to, a step of coating the recording medium with a coating layer. Examples of the intermediate treatment step include, but are not limited to, a step of pre-heating the recording medium before the intermediate transfer step or before the transfer step. Examples of the post-treatment step include, but are not limited to, a step of cleaning the recording medium.

The ink composition according to this embodiment can also be suitably used for sublimation transfer that does not use an intermediate transfer medium. Examples of the sublimation transfer that does not use an intermediate transfer medium include, but are not limited to, a method including applying the ink composition according to this embodiment by an ink jet method to an ink-receiving layer of a recording medium (e.g., a film product) provided with a releasable ink-receiving layer, directly heating the recording medium provided with the ink-receiving layer having the ink composition thereon to cause the dyeing of the recording medium by sublimation diffusion from the overlying ink-receiving layer, and releasing the ink-receiving layer from the recording medium to provide a dyed article.

Dyed Article

A dyed article according to this embodiment is obtained using the ink composition.

EXAMPLES

The present invention will be described below in more detail by way of Examples and Comparative Examples. The present invention is not limited by Examples described below.

Materials for Ink Compositions

Main materials for ink compositions used in Examples and Comparative Examples described below are as follows.

Dye

DY54: C.I. Disperse Yellow 54
DR60: C.I. Disperse Red 60
DB359: C.I. Disperse Blue 359
DB360: C.I. Disperse Blue 360
DO25: C.I. Disperse Orange 25
DBr27: C.I. Disperse Brown 27
SO60: a compound represented by Formula (1)

Dispersant

NS: a β-naphthalenesulfonic acid-formaldehyde condensate

Surfactant

BYK-348: a silicone surfactant available from BYK Japan KK.

Water-Soluble Organic Solvent

GL: glycerol
TEGMME: Triethylene glycol monomethyl ether

Preparation of Ink Compositions

The materials were mixed at the compositions shown in Table 1 described below and stirred well to provide ink compositions. In Table 1 described below, the unit of numerical values is mass % with respect to the total mass (100.0 mass %).

Reflectance at Wavelength of 380 nm or More and 520 nm or Less

The reflectance of dyed articles to be obtained at a wavelength of 380 nm or more and 520 nm or less was determined by using recorded articles obtained as follows: inks respectively containing 4 mass % of the seven dyes described below were ejected by an ink jet method in the same manner and transferred under the same conditions as in black density evaluation described below. The results for each dye are shown below.

The following reflectances are the averages at a wavelength of 380 nm or more and 520 nm or less.
DY54: 0.13
DR60: 0.08
DB359: 0.20
DB360: 0.15
DO25: 0.03
DBr27: 0.03
Formula (1)=SO60: 0.03

TABLE 1

| | Composition of Ink Jet Black Ink Composition for Sublimation Transfer | | | | | | | | | | | Evaluation | | |
|---|---|---|---|---|---|---|---|---|---|---|---|---|---|---|
| | | Dye | | | | | | | Dispersant | Surfactant | Water-Soluble Organic Solvent | | Black Density | Intermittncy | Tinge |
| | Water | DY54 | DR60 | DB359 | DB360 | DO25 | DBr27 | SO60 | NS | BYK-348 | GL | TEGMME | | | |
| Example 1 | 77.2 | 0.5 | — | — | 2 | 2 | — | 1 | 5.5 | 0.8 | 8 | 3 | A | B | A |
| Example 2 | 70.2 | 0.5 | — | — | 2 | 2 | — | 1 | 5.5 | 0.8 | 15 | 3 | A | A | A |
| Example 3 | 70.2 | 0.5 | — | — | 2 | — | 2 | 1 | 5.5 | 0.8 | 15 | 3 | A | A | A |
| Example 4 | 68.2 | 0.5 | — | — | 2 | 2.5 | — | 1.5 | 6.5 | 0.8 | 15 | 3 | A | A | A |
| Comparative Example 1 | 72.2 | 0.5 | 2 | 2 | — | — | — | — | 4.5 | 0.8 | 15 | 3 | D | A | B |
| Comparative Example 2 | 64.2 | 0.5 | 2 | 6 | — | — | — | — | 8.5 | 0.8 | 15 | 3 | B | C | B |
| Comparative Example 3 | 72.2 | 0.5 | 2 | — | 2 | — | — | — | 4.5 | 0.8 | 15 | 3 | A | B | C |
| Comparative Example 4 | 70.2 | 0.5 | — | — | 2 | 3 | — | — | 5.5 | 0.8 | 15 | 3 | A | B | C |

Black Density

A grayscale with 20 patches was outputted on an intermediate transfer medium, TRANSJET Classic (available from Cham Paper Group Switzerland Inc.), by performing recording using the ink compositions with a resolution of 1,440×720 dpi with an ink jet printer, SureColor SC-F7000 available from Seiko Epson Corporation. Given that the maximum amount of ink ejected is defined as duty 100%, 20 patches from duty 5% to duty 100% were formed in increments of 5%.

Subsequently, the surface of the intermediate transfer medium having the ink thereon was brought into close contact with a fabric (100% polyester, Amina, available from Toray Industries, Inc.), which was a white recording medium. In this state, sublimation transfer was carried out by performing heating at 200° C. for 60 seconds using a heat press machine (TP-608M, available from Taiyoseiki Co., Ltd.) and each dyed article was obtained accordingly.

The Optical density (OD) value of the obtained dyed article was determined by using a reflection densitometer (trade name: Spectrolino, available from GretagMacbeth). The black density was evaluated based on the OD value in accordance with the following evaluation criteria.
Evaluation Criteria
  A: The OD value is 1.60 or more.
  B: The OD value is 1.58 or more and less than 1.60.
  C: The OD value is 1.56 or more and less than 1.58.
  D: The OD value is less than 1.56.
Intermittent Characteristics The ejection stability during intermittent printing (intermittent characteristics) in an environment at a temperature of 40° C. and at a relative humidity of 20 RH % was evaluated by using an ink jet printer, SureColor SC-F7000 available from Seiko Epson Corporation. First, it was confirmed that the ink composition was properly ejected from all nozzles. An ink droplet was then ejected onto a point A on an intermediate transfer medium, TRANSJET Classic (Cham Paper Group Switzerland Inc.), to provide an ejection pattern 1. Next, a carriage was driven for 4.3 seconds while the ink was not ejected. An ink droplet was then ejected again onto the point A on the intermediate transfer medium, TRANSJET Classic (Cham Paper Group Switzerland Inc.), to provide an ejection pattern 2.

By comparing the ejection pattern 1 and the ejection pattern 2 on the intermediate transfer medium, the amount of misalignment between the landing positions of the ink droplets was determined with an optical microscope and evaluated in accordance with the following evaluation criteria.
Evaluation Criteria
  A: The amount of positional misalignment between dots was less than 80 μm.
  B: The amount of positional misalignment between dots was 80 μm or more and less than 120 μm.
  C: The amount of positional misalignment between dots was 120 μm or more.
Tinge The dyed articles obtained in the evaluation of the black density were visually observed and evaluated for their tinge in accordance with the following evaluation criteria.
Evaluation Criteria
  A: Neither bluish tinge nor greenish tinge was visually observed.
  B: Not bluish tinge but greenish tinge was visually observed.
  C: Both bluish tinge and greenish tinge were visually observed.

The entire disclosure of Japanese Patent Application No. 2015-009814, filed Jan. 21, 2015 is expressly incorporated by reference herein.

What is claimed is:
1. An ink jet black ink composition for sublimation transfer, comprising:
  water;
  a water-soluble organic solvent;
  C.I. Disperse Blue 360; and two or more other disperse dyes that each individually achieve a reflectance of less than 0.1 at a wavelength of 380 nm or more and 520 nm or less on a dyed article, wherein the two or more other disperse dyes include a compound represented by Formula (1):

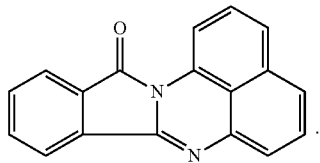

2. The ink jet black ink composition for sublimation transfer according to claim 1, wherein the total content of the C.I. Disperse Blue 360 and the two or more other disperse dyes is 4.0 to 8.0 mass %.

3. The ink jet black ink composition for sublimation transfer according to claim 1, wherein the mass ratio A of the total content of the two or more other disperse dyes to the content of the C.I. Disperse Blue 360 is 1.0 to 3.0.

4. The ink jet black ink composition for sublimation transfer according to claim 1, wherein the water-soluble organic solvent includes at least one selected from the group consisting of glycerol and glycols.

5. The ink jet black ink composition for sublimation transfer according to claim 1, wherein the content of the water-soluble organic solvent is 10 to 30 mass %.

6. A method for producing a dyed article, comprising:
applying the ink jet black ink composition for sublimation transfer according to claim 1 to an intermediate transfer medium by an ink jet method; and
transferring to a recording medium the C.I. Disperse Blue 360 and the two or more other disperse dyes contained in the ink jet black ink composition for sublimation transfer by performing heating in a state where a surface of the intermediate transfer medium having thereon the ink jet black ink composition for sublimation transfer faces a surface of the recording medium to be dyed.

7. A dyed article obtained by using the ink jet black ink composition for sublimation transfer according to claim 1.

* * * * *